(12) United States Patent
Beckert et al.

(10) Patent No.: US 8,271,889 B1
(45) Date of Patent: Sep. 18, 2012

(54) AUTOMATICALLY UPDATED USER INTERFACES FOR A MOBILE DEVICE

(75) Inventors: Joerg Beckert, San Francisco, CA (US); GuiQin Zhang, Wilmington, MA (US); Srini Attaluri, San Jose, CA (US); Rupen Chanda, San Francisco, CA (US); Anssi Kesti-Helia, San Francisco, CA (US); Antti Piira, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 673 days.

(21) Appl. No.: 11/945,260

(22) Filed: Nov. 26, 2007

(51) Int. Cl.
*G06F 3/14* (2006.01)
*G06F 3/17* (2006.01)

(52) U.S. Cl. .......... 715/762; 717/159; 709/217; 705/34; 705/40; 703/23; 370/342

(58) Field of Classification Search .......... 715/200–277; 700/701–799, 800–866; 709/201–229; 705/50–79, 705/40; 345/30–111; 348/206–231.9; 703/23; 370/342; 717/159
See application file for complete search history.

(56) References Cited

U.S. PATENT DOCUMENTS

| | | | |
|---|---|---|---|
| 7,275,243 B2 * | 9/2007 | Gibbons et al. | 717/159 |
| 2003/0187794 A1 * | 10/2003 | Irwin et al. | 705/40 |
| 2003/0236657 A1 * | 12/2003 | Ryzl | 703/23 |
| 2006/0023688 A1 * | 2/2006 | Kilian-Kehr et al. | 370/342 |
| 2007/0130331 A1 | 6/2007 | Kao et al. | |
| 2008/0147530 A1 * | 6/2008 | Kwan et al. | 705/34 |
| 2008/0215706 A1 * | 9/2008 | Kilian-Kehr et al. | 709/217 |

OTHER PUBLICATIONS

Chanda, "Embedded Document within an Application", U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth filed Mar. 1, 2004, Management System", Pending U.S. Appl. No. 10/791,311 27 pages.

* cited by examiner

Primary Examiner — Ruay Ho
(74) Attorney, Agent, or Firm — Fish & Richardson P.C.

(57) ABSTRACT

Methods, systems, and apparatus, including computer programs encoded on a computer storage medium, for automatically updating user interfaces for a mobile device. In one aspect, a first set of instructions from an automatically synchronizing data store are received. The first set of instructions are executed to provide an interface between a user and an operating system on the mobile device. The data store is automatically updated with a second set of instructions. The second set of instructions are executed to provide a modification to the interface between the user and the operating system on the mobile device.

25 Claims, 4 Drawing Sheets

AUTOMATICALLY UPDATED USER INTERFACES FOR A MOBILE DEVICE

BACKGROUND

The present disclosure relates to user interfaces for mobile devices. In a mobile information system, subscribers may register with a wireless service provider to receive various types of content from the service provider on their mobile devices. The subscriber's mobile device may include a resident interactive multimedia application environment that includes capabilities for displaying content, such as graphics, video, animation, audio, and the like. Content provided to mobile devices equipped with such application environments is sometimes delivered in executable file formats such as the described SWF binary vector graphics format. A conventional mobile device operating system (OS) provides a graphical user interface that allows a user to interface with the mobile device's functionality. For example, a user of a conventional device may use the device's OS to determine contacts, place calls, view incoming caller identification information, and perform other tasks associated with the mobile device. However, the functionality of such user interfaces typically cannot be modified to suit a user's needs.

SUMMARY

This specification describes technologies relating to user interfaces on a mobile device.

In general, one aspect of the subject matter described in this specification can be embodied in a method that includes receiving a first plurality of instructions from an automatically synchronizing data store. The first plurality of instructions when performed provides an interface between a user and an operating system on a mobile device. The method further includes performing the first plurality of instructions. The method also includes automatically updating the data store with a second plurality of instructions. The second plurality of instructions when performed provides a modification to the interface between the user and the operating system on the mobile device. The method also includes performing the second plurality of instructions. Other embodiments of this aspect include corresponding systems, apparatus, and computer program products.

These and other embodiments can optionally include one or more of the following features. The interface can provide access to at least one of: a call log, a user contact, and a user preference. Performing the first plurality of instructions can include using a virtual machine to execute the first plurality of instructions. The method (and corresponding embodiments) can further include identifying a third plurality of instructions that when executed provides an interface between the user and the operating system on the mobile device; and performing the third plurality of instructions after an unsuccessful performance of the first plurality of instructions or an unsuccessful performance of the second plurality of instructions. The method (and corresponding embodiments) can also include storing content in the data store; and automatically updating the content in the data store. The first plurality of instructions when performed can be capable of reproducing the content. The content can include at least one of: game content, image content, video content, audio content, text content, and vector graphics content. Automatically updating the content in the data store can include updating the content at a frequency, the frequency adjusted based on the content. The interface provided from performing the first plurality of instructions can include a first user interface; and the modification to the interface from performing the second plurality of instructions can include a second user interface. The second user interface can include functionality that is different from the first interface. Automatically updating the data store with the second plurality of instructions can include receiving an indicator from a user to switch from the first user interface to the second user interface; and updating the first plurality of instructions in response to the indicator.

Particular embodiments of the subject matter described in this specification can be implemented to realize one or more of the following advantages. The experience of a mobile user may be enhanced by using an interface to the device's platform that may be more tailored to the user's interests and/or preferences than a conventional OS. Because a home screen is a base application with which a user may interact the most, content providers may gain greater access to subscribers who are most interested in the content, and may increase advertising revenue. Content providers may also provide updated home screens to users without the user having to request an update, which may allow content providers to rectify problems in content more efficiently.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
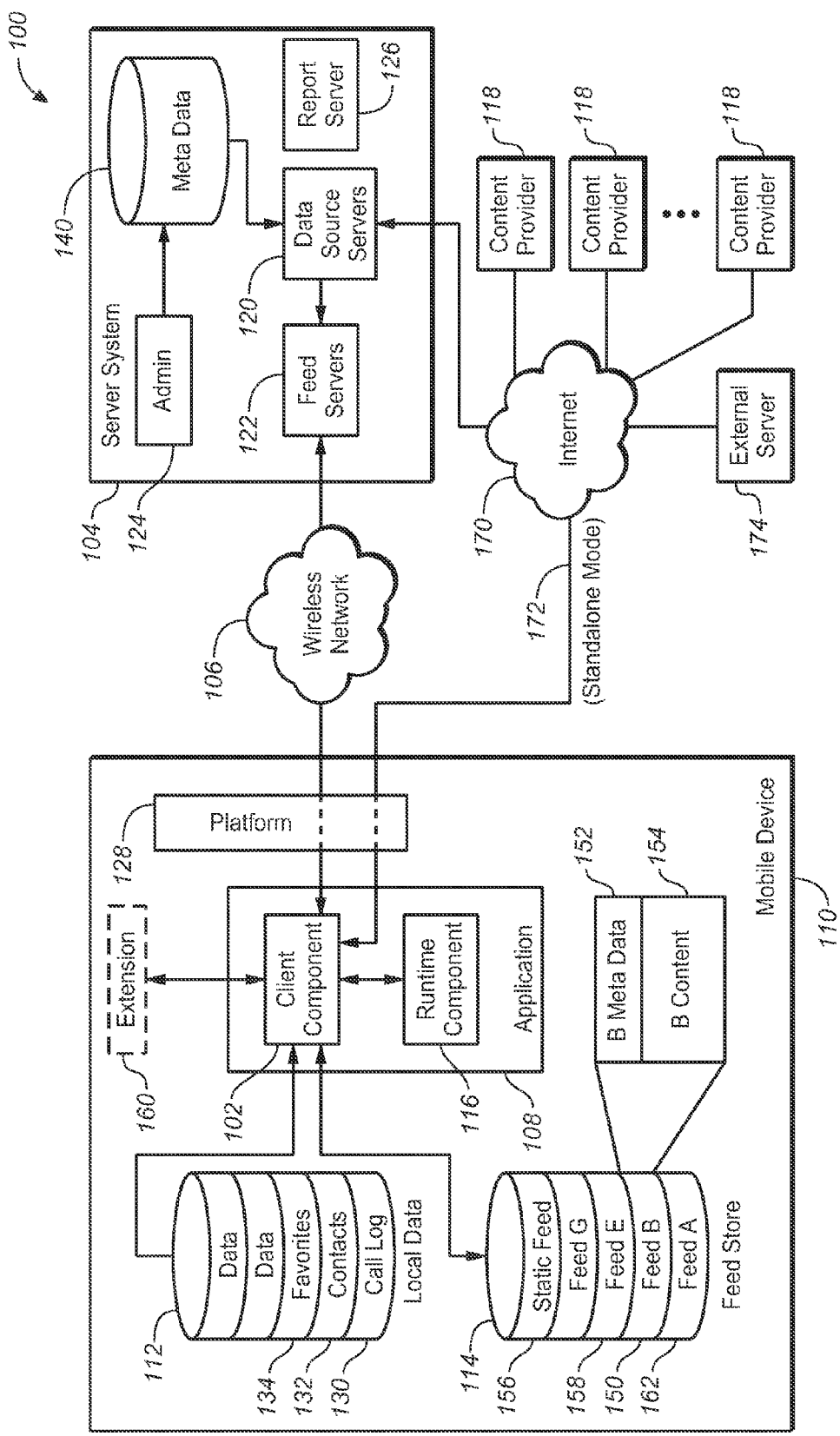
FIG. 1 is an illustration of an example mobile information system in accordance with some aspects of the present disclosure.

FIG. 1 is an illustration of an example mobile information system in accordance with some aspects of the present disclosure. System 100 represents a mobile information system for delivering mobile data services to mobile device 110. In a mobile information system, subscribers may register with a wireless service provider to receive various types of content from the service provider on their mobile devices, such as, for example, cellular phones, games, media players, personal data assistants (PDAs). Third party content providers may also register or contract with the wireless service provider to provide various types of content to subscribers over a network, such as the Internet, via the service provider. The subscriber's mobile device may include a resident interactive multimedia application environment that includes capabilities for displaying graphics, video, animation, audio, and the like. Examples of such interactive multimedia application environments are the different versions of the Adobe® Flash®-based platform available from Adobe Systems Incorporated of San Jose, Calif. Content provided to mobile devices equipped with such application environments are sometimes delivered in executable file formats such as the described SWF binary vector graphics format. SWF provides a compact, tag-based, easily extendible format that supports streaming, bitmap and vector graphics, and scripting.

Figure 4:
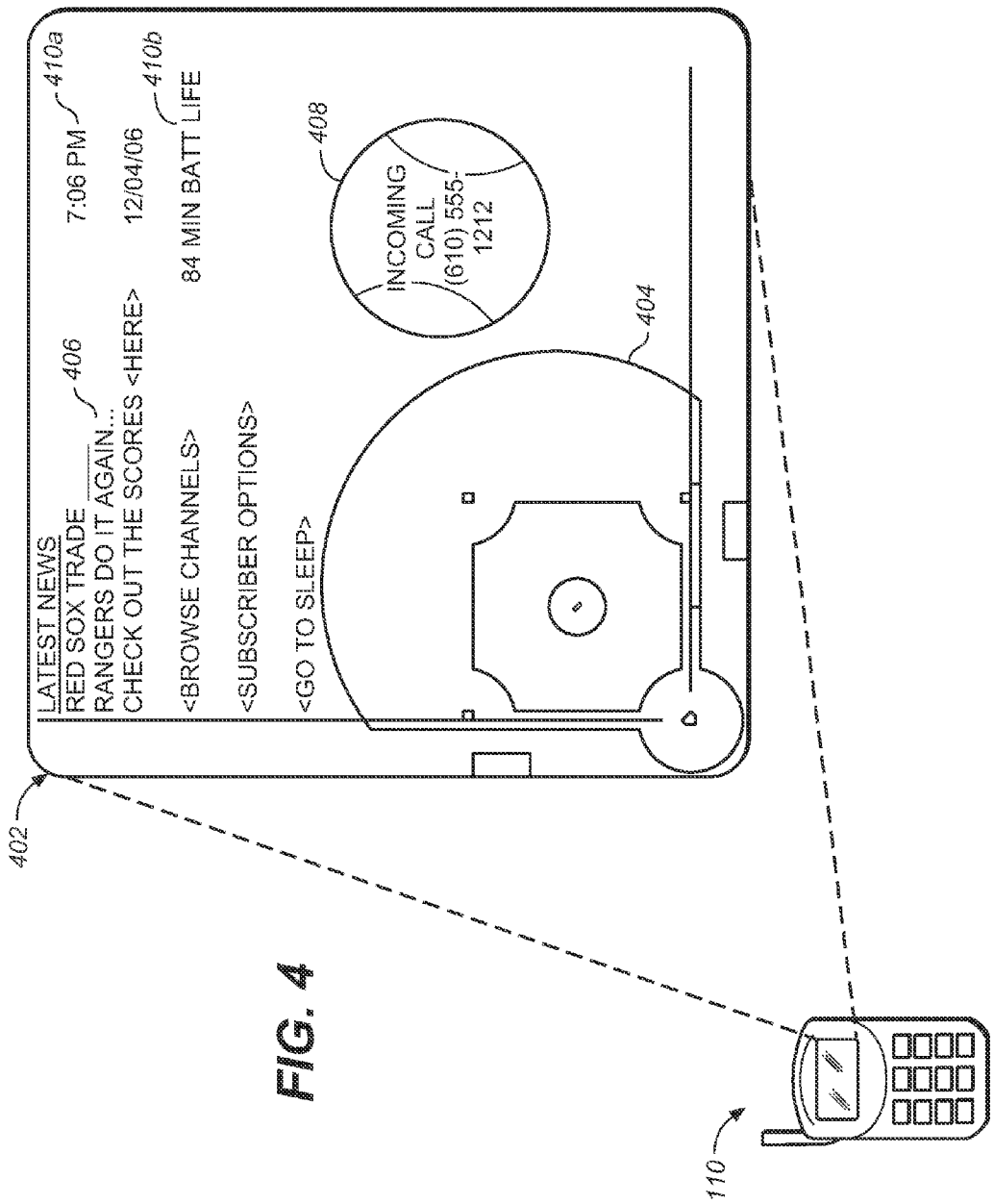
FIG. 4 illustrates an example home screen.

In some implementations, wireless service providers deliver content to the mobile devices of their subscribers in the form of home screens and information channels. In general, a home screen is a graphical user interface that may function as the launching point for using the device and may be readily available to a user. For example, a conventional mobile device's OS may provide a user interface when the device starts from which other applications may be launched and/or from which other functionality of the mobile device may be accessed and used. A user may use a homescreen to interact with the personal information management (PIM) data, address book entries, and recent call activity in addition to or in lieu of interacting directly with the device's OS. For example, a home screen may include access to a device's call logs, user contacts, preferences and setting, favorites, task lists, and other data stored locally, as well as the ability to ring and/or vibrate the mobile device, play audio, video, games, animation, and/or other content, check a caller ID, and to perform other system related functions. FIG. 4 illustrates an example home screen. As shown in FIG. 4, mobile device 110 displays a home screen 402. Home screen 402 generally includes information content 406, rich content 404, integrated content 408, and device information 410. The information content 406 may be content that is updated in an automatically synchronizing data store (e.g., data store 114 in FIG. 1). The home screen 402 may be configured to receive updates to the information content 406 and display the updated information content on the screen. The rich content 404 may include a video, image, animation, or other graphic, and may also include audio content alone or integrated with visual content. The integrated content 408 may combine rich content with underlying device functionality. For example, the home screen 402 may be configured to animate a baseball that is hit from a batter by displaying the animation in rich content 404, where the baseball gets larger as it moves and eventually displays the incoming call information to a user, as depicted at 408. Other content may also be displayed in integrated content 408, such as, for example, a picture of the incoming caller. The incoming call information that would conventionally be displayed to a user using the device's OS would be communicated to the user and displayed. Some device information may be displayed using other type of content such as text, the system time 410a or the reserve battery power 410b.

Information channels or channels are applications that reproduce content on a mobile device. Channels may display news, information, or other content that is synchronized between the client and the server. A home screen may also include information that is synchronized with a server. In some implementations, a home screen is a channel. In various implementations, home screens and channels are Adobe Flash® applications. However, other types of applications are possible.

Each home screen and information channel may originate with the wireless service provider or may originate with third party content providers. When a subscriber subscribes to a particular home screen or information channel, the wireless service provider delivers content associated with that home screen or information channel to the subscriber's mobile device. The content may be delivered as a feed to a persistent storage file system (i.e., a data store) located on the mobile device. The data store may be logically divided into separate compartments or memory allocations with each home screen or channel assigned its own compartment on a static or dynamic basis. Periodically, when new content becomes available, and/or at predetermined times, the wireless service provider may deliver content updates to the mobile device. This content may be in any of a variety of forms, such as video, audio, text, images, and the like. The updates may be in whole or in part of the previous content. The updates may be provided according to a predetermined schedule, in response to a request from the mobile device, in response to an availability of updates at the content provider, in response to an expiration or consumption (e.g., viewing) of content previously delivered to the mobile device, or in some other way. Because the content is stored locally on the mobile device and frequently updated, the subscriber is usually able to access the home screen or channel without having to wait for content or content updates to be delivered over the network. The content may be automatically delivered to the mobile device in the background (e.g., without a specific user request and/or while the mobile device is otherwise idle or being used to view other home screens or channels or perform other operations).

For example, a wireless service provider may offer several different home screens and/or information channels to its subscribers. Some home screens and/or information channels may be freely available to all subscribers, while other home screens and information channels may require premium subscriber status. The content of some home screens and information channels may originate with the wireless service provider. The content of other home screens and information channels may originate with third parties that have registered with the service provider. The content of still other home screens and information channels may originate with other sources.

An update frequency for updating content may be associated with each home screen or channel. In some instances, content may not be updated at the nominal update time or update time interval, for example, due to an interruption in network connectivity or power loss at the nominal update time. In such an instance, content may be updated at a different time, for example, when the mobile device reestablishes connectivity. An update time interval can be equivalently discussed as an update frequency. An interval is a quantity with units of time, such as "seconds" or "hours." A frequency is a quantity with units of inverse time, such as "per hour" or "per second" (i.e. Hertz). For the purposes of this disclosure, the terms "update frequency" and "update interval" may be used interchangeably, and it will be understood that update frequency refers to a number of updates per unit time and update interval refers to an amount of time between updates.

The update frequency for a given home screen or channel may be determined by a content provider, a server, the mobile device, or any other entity included in the mobile information system. The update frequency for a given home screen or channel may be determined based on update or channel content, user preferences, server or network volume, network bandwidth, update availability, signal strength, remaining battery power and/or other factors such as time of day. For example, an update frequency may be based on an identification of an update type, size and/or data format, or based on the actual content of an update. In some implementations, the server may determine the update interval or update time for updating all data on a mobile device. All home screen and channel data may be updated at once, for example in the background, allowing a user to later browse the data without having to wait for updates. A content update interval may depend on content, allowing the data stored on a mobile device to be updated more frequently at times when the updates are more frequently available and/or relevant. For example, a channel Stock Quotes may have no updates during certain hours of the evening and/or night, so a long update interval (e.g. 10 hours) may be assigned to the channel Stock Quotes during the evening and/or night hours. During business hours, however, the update interval for the channel Stock Quotes may be much shorter (e.g. 300 seconds), according to, for example, user preferences or content provider recommendations.

Home screen and channel content may include text, images, vector graphics, instructions, bitmaps, frame-based animation, video, combinations of these, and/or in any other format supported by the mobile information system, and may include executable scripts or other sequences of instructions. Depending on the format of the home screen or channel content, an application running on the mobile device, such as a media player or other type of runtime component, may be invoked to run the script, execute the instructions, or otherwise display the content. One example of such a mobile information system is described in U.S. patent application Ser. No. 10/791,298, filed Mar. 1, 2004 and entitled "MOBILE RICH MEDIA INFORMATION SYSTEMS," the entire contents of which are hereby incorporated by reference.

Turning back to FIG. 1, the mobile information system represented in system 100 is administered by a wireless service provider, such as T-Mobile®, Verizon Wireless®, or Sprint Nextel®, that operates wireless network 106. Subscribers to the wireless service may receive external content from content providers 118 through mobile device 110. In some implementations, mobile device 110 is a mobile phone. In other implementations, mobile device 110 is a personal data assistant, a laptop computer, or any other device capable of receiving content over a wireless network (e.g., network 106). Mobile device 110 may be configured to store local data 112, which may include call log 130, contacts 132, and favorites 134, as well as various other types of local data (e.g., settings and preferences, calendar appointments and reminders, task lists, and the like). Call log 130 may represent calls recently initiated or received by mobile device 110. Contacts 132 may represent a subscriber's associates and may include names, home and business addresses, phone numbers, email addresses, and other information related to the subscriber's associates. Favorites 134 may represent the phone numbers associated with the subscriber's calling plan. Call log 130, contacts 132, and favorites 134 represent examples of data that may be stored as local data 112 on mobile device 110. Individual implementations may include none, some, or all of these examples, in addition to other types of local data not shown.

At a high level, server system 104 may retrieve information from content providers 118, organize the retrieved information along with some or all of any associated metadata 140 into individual information feeds, and deliver the information channel feeds to client 102. Client 102 may then store the information feeds, including the associated metadata, in data store 114. In addition to the dynamic channel feeds received from server system 104, data store 114 may also contain one or more static feeds 156. Static feed content and associated metadata may be preloaded on mobile device 110 instead of delivered by server system 104. Feeds in data store 114 may provide information and updates for subscribed home screens and channels, as well as un-activated home screens, calendar user interface and services, or other user interfaces or specialized application services. A static feed 156 may include information or content that may be related to a safe mode or default home screen, which may be executed if problems occur with the main home screen.

Client 102 and runtime component 116 may form two parts of a single application 108 running on mobile device 110. The application 108 may include, running on a device platform 128, a virtual machine such as the Adobe® Flash® Player (i.e., a virtual machine capable of executing ActionScript™), a Java Virtual Machine, the Common Language Runtime (available from Microsoft Corporation), or some other virtual machine or module capable of executing instructions or script files.

In some implementations, the functionality of runtime component 116 may be extended. Such an extension 160 may be used to expand the functionality of runtime component 116, such as by providing support for additional commands. For example, a service provider may wish to provide content that displays or otherwise accesses or manipulates data from local data 112 such as call log 130. The service provider may develop a custom command or instruction that can be provided in the feed and stored in data store 114. Such a command may be unrecognized by an un-extended runtime component 116. The service provider may then install a custom extension 160 on mobile device 110 that recognizes and performs the custom command or instruction, effectively increasing the number of commands or instructions recognized by runtime component 116. In another example, a third party content provider may develop a custom command or instruction to perform some other activity. Extension 160 may be distributed preinstalled on mobile device 110 or may be downloaded to mobile device 110, for example, over wireless network 106.

Client 102 provides a framework for displaying and managing content received on mobile device 110, including content received from server system 104. Client 102 may be responsible for the caching and rendering of received content, for communication with server system 104, and for various other tasks. Client 102 may manage subscriber input and memory devices 112 and 114. In addition, client 102 may manage security features that protect the privacy of subscribers and content and prevent unauthorized parties from interfering with the service. In some implementations, client 102 is distributed preinstalled on mobile device 110, while in other implementations, client 102 or an update to client 102 is downloaded to mobile device 110, for example, over wireless network 106.

Client 102 may access runtime component 116 to render a user interface and content. In some implementations, runtime component 116 is a media player that supports vector graphics, bitmaps, and frame-based animation, as well as text input and dynamic text. Runtime component 116 may be able to process files, such as SWF files, in which content providers 118 use native device fonts or embed arbitrary fonts. Runtime component 116 may also support scripting integration with mobile device 110 capabilities, including keypad navigation, button presses, notification, messaging, and media playback, as well as integration with general mobile device 110 operating system functionality. This enables client 102 to be integrated with other mobile device 110 applications and functionalities. Scripting may be accomplished with ActionScript™ or any other suitable scripting language supported by runtime component 116.

Client 102 may be configured to interact with mobile device 110's underlying features and applications through a set of scriptable commands. Such commands may enable channel content to retrieve and set subscriber preferences, provide time and date information from the host environment, or launch external applications such as a browser or media player. In some implementations, upon launching an external application, the subscriber is instantly transferred to that application. Client 102 may maintain the state of the user interface so that the subscriber can return to the same screen of client 102 from which the external application was launched, creating a perception of an integrated experience. A home screen, for example, may be executed by client 102. The home screen may launch an individual information channel and return a user to the home screen after the user is finished with the information channel.

Client 102 may have a fully customizable user interface design that consists of instructions. These instructions may be included in Flash® movies (i.e., SWF files) independent of client 102's core functionality. In some implementations, the SWF files enable subscribers to use mobile device 110's soft keys to control navigation and client 102's meta functions such as setting preferences. Client 102 may be updated over wireless network 106 and may use an asynchronous communication protocol that updates all content through a background delivery mechanism that is transparent to subscribers. This enables subscribers to continue browsing one information channel, for example, channel A 152, while a home screen or different information channel is updated in the background.

A client 102 may be configured to have a single home screen 150 active at any given time. The home screen may be updated in the background while a user is navigating a channel or an update may be downloaded while the user is viewing the home screen. In the latter case, the update may be downloaded and stored in data store 114. A user may initiate the transfer from the previous home screen to the newly updated home screen. The newly updated home screen may also be loaded after the device restarts.

Some embodiments utilize one or more discovery channels stored in data store 140, such as discovery channel feed E 158. A discovery channel 158 is a channel that may include information related to the available information channels and home screens to which a user may have access. The discovery channel 158 may be used by the user to find or discover and download new content from the server system 104. The new content may be organized by namespace, where each namespace may be associated with a content provider 118. A discover channel 158 may be configured to restrict the available information channels and home screens to certain namespaces.

Subscribers can also change their preferences when offline; the transaction-based client-server protocol may ensure that such requests will be fulfilled the next time client 102 connects to server system 104. For example, a user may login to a website maintained by the service provider and may request that a new home screen be activated during the next connection. Communications between client 102 and server system 104 may be facilitated through libraries native to platform 128. Platform 128 represents the device-dependent operating system running on mobile device 110. Example implementations of platform 128 are BREW® OS, Symbian OS™, BlackBerry® OS, Windows Mobile® OS, and Palm OS®.

When running in background mode, client 102 may minimize battery usage while periodically receiving updates from server system 104. In some implementations, subscribers can choose between a number of battery-conserving update options, for example, always update, update only when battery strength is above a certain level, and never update. If supported by platform 128, different applications may be running simultaneously. In such cases, client 102 may minimize its use of memory resources when other applications are active. For example, client 102 may have a hibernate mode in which it consumes only a fraction of its normal operating memory. Client 102 may also be configured to limit the number of information channels to which a subscriber may subscribe. When this limit is reached, client 102 may require a subscriber to remove an information channel before a new information channel may be added. Client 102 may also support Short Message Service (SMS) signaling, allowing server system 104 to awaken client 102 and initiate an immediate content update in the case of important events such as breaking news or an immediate retraction of inappropriate content.

Server system 104 may include clusters of feed servers 122 and data source servers 120, as well as report server 126. Report server 126 may allow service providers to monitor server activities and network traffic and may be integrated with other enterprise reporting solutions. The client-server architecture of system 100 may use clustering technology to help ensure performance, reliability, and scalability while minimizing deployment complexities through a flexible integration framework. Server system 104 may aggregate content from external content providers 118 received over the Internet 170 and organize the content into content feeds. Server system 104 may filter content feeds based on user preferences, mobile device 110 types, and access controls. Server system 104 may deliver the content feeds to client 102 over wireless network 106. Data source servers 120 may retrieve, normalize, and aggregate content from the web servers of content providers 118, may transform various formats of retrieved content, for example, into a common XML format, and may pass the content on to feed servers 122 for delivery to client 102. Retrievals may be scheduled at predetermined intervals, at which times only differential updates may be collected. Data source servers 120 may be configured to handle content feeds in various formats (e.g., RSS, Atom, XML, etc.). Content feeds may support embedded content types including, for example, text, images, and SWF files.

Using system 100, service providers may be able to provide targeted data service offerings to subscribers. Service providers may be able to promote specific content bundles to certain segments such as business people, teens, casual users, and others. Service providers may be able to make specific content bundles available to all subscribers in, for example, a home screen/channel guide, allowing subscribers to select specific content bundles. To increase network efficiency, server system 104 may operate in an occasionally connected data model and may use a communication protocol that enables differential updates, minimizing unnecessary exchanges of data between server system 104 and client 102. For example, in the case of a weather channel, only an update to the temperature may be required, while all other content, such as images, video, or forecasts, remains the same.

Server system 104 may be equipped with an administrator process 124 that functions to manage the servers, including home screen/channel administration, subscriber administration, and system management. Using administrator process 124, service providers can check, for example, the amount of network traffic each home screen/channel generates, deactivate poorly performing home screens and channels, and dynamically provision, modify, or remove home screens and channels, among other tasks. As part of home screen/channel administration, service providers may use administrator process 124 to configure and store metadata 140 and associate metadata 140 with individual feeds. Metadata 140 may include security information, update frequency, and any other data facilitating the administration of the feeds. In some implementations, the metadata 140 associated with a home screen or channel is delivered to client 102 with the initial delivery of content for the particular home screen or channel, and thereafter delivered only if the metadata 140 has changed. In other implementations, the metadata 140 or a subset of the metadata 140 associated with a home screen or channel is delivered to client 102 with each delivery of content for the particular home screen or channel. In still other implementations, a different scheme for delivering metadata 140 may be employed, so long as metadata 140 received by client 102 is associated with at least one home screen or channel.

When client 102 receives a content update from server system 104 via the feed, client 102 stores both the substantive content and the metadata associated with the content in data store 114. For example, when client 102 receives a content update for home screen B, client 102 updates home screen B feed 150 in data store 114. Both home screen B content 154 and the associated home screen B metadata 152 are stored. Home screen B feed 150 may be updated multiple times before a subscriber ever accesses it. When a subscriber accesses home screen B through the mobile device 110 user interface, client 102 may retrieve home screen B content 154 (e.g., a SWF file) and home screen B metadata 152 (e.g., a set of permission indicators) and provide both to runtime component 116 (e.g., a media player). In some implementations, runtime component 116 makes no attempt to interpret or otherwise process home screen B metadata 152 but simply retains them as associated with Channel B content 154. As runtime component 116 executes home screen B content 154, any attempt by home screen B content 154 to perform a protected or restricted activity may cause runtime component 116 to pass one or more home screen B permissions 152 back to client 102 along with the relevant data associated with the protected or restricted activity. Client 102 may then inspect home screen B permissions 152 to determine whether the attempted activity is allowed for home screen B. If the attempted activity is not allowed, client 102 may prevent the execution of the attempted activity.

The home screen activation process on mobile device 110 begins with client 102 loading a file from data store 114 into runtime component 116. This file may be referred to as a root SWF. In some embodiments of the system 100, the data store 114 receives updates from content providers 118. Content providers 118 may recommend update frequencies for channels and include an identification of the recommended update frequency in data sent to server 104. Server 104 may receive data (e.g. from client 102 or from internet 170) identifying a list of home screens and channels to which mobile device 110 subscribes and the highest (or most frequent) recommended update frequency. Administrator 124 may use the highest recommended update frequency to determine an update interval for all channel content on the mobile device 110. An identification of the update interval determined by administrator 124 may be included in data transmitted to client 102. Client 102 may then determine a time at which to request updates from server 104 based on the transmitted identification. At the determined time, client 102 may send a request to server 104 for updates. In response to the request, server 104 may send updates to client 102.

A root SWF is typically allowed to access content from its own channel feed without permission. However, if a root SWF attempts to access content from a different feed, a cross feed access permission may be required. A cross feed access permission is one example of a permission that may be associated with a particular channel. A SWF with permission to load items from another feed may not necessarily have permission to script SWFs from that feed. A SWF attempting to access variables or functions inside of a second SWF is said to be scripting the second SWF. In some implementations, a separate permission governs whether a SWF from a channel feed may be scripted, and a SWF with permission to load items from a particular feed may script SWFs from that feed only if SWFs from that feed have permission to be scripted. Separate permissions may govern whether a SWF is allowed to perform other activities, for example, to load video files.

A root SWF may attempt to load a child SWF. If the child SWF is loaded from the same feed as the root SWF, the child SWF will typically inherit the permissions of the root SWF. If the child SWF is loaded from any other location, additional permissions associated with the root SWF may determine what its remote child SWF is allowed to do. For example, a permission may determine whether a remote child SWF is allowed to access data store 114, and another permission may determine whether a remote child SWF is allowed to inherit permissions from its parent SWF.

A root or child SWF may attempt to perform various activities using the ActionScript™ getURL global function. Such activities may include replacing the root SWF, loading a document into a browser, or sending an SMS or Multimedia Message Service (MMS) message, to name a few. In some implementations, these and other getURL requests are each associated with a separate permission. For example, a root SWF may not require a permission to replace itself, but a child SWF may require a permission to replace the root SWF. An HTTP/HTTPS call may require a permission, and an HTTP/HTTPS call with a post data request may require an additional, separate permission.

Figure 2:
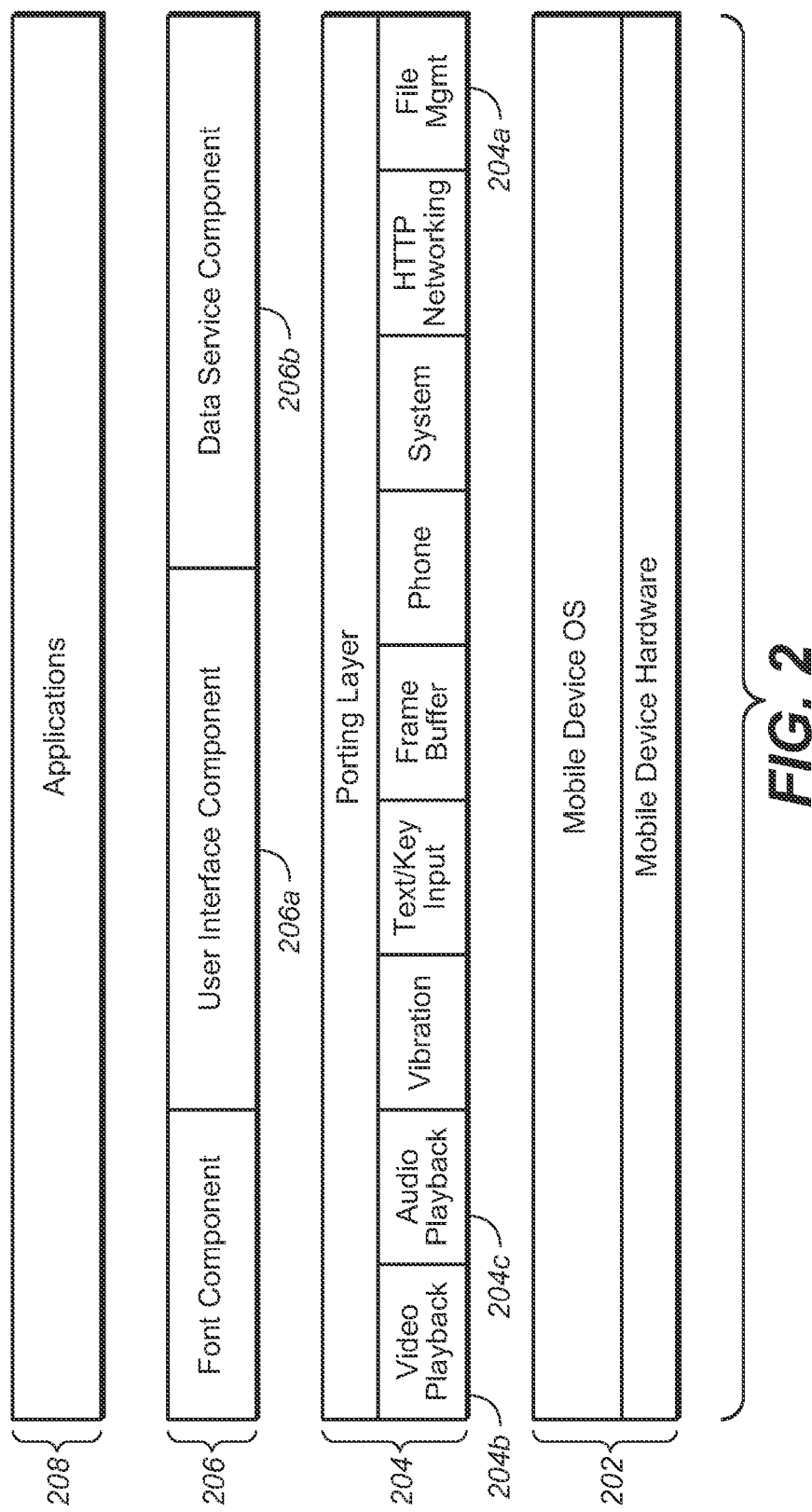
FIG. 2 is an illustration of an example software architecture in accordance with some aspects of the present disclosure.

FIG. 2 is an illustration of an example software architecture in accordance with some aspects of the present disclosure. The device hardware and operating system reside at the lowest level, device platform layer 202. The display, speakers, memory, processors, wireless transceiver, and other hardware may reside at this level. A hardware decoder may also be present in the device platform layer 202. An operating system may interact with the hardware by transmitting and receiving data and commands. The manufacture of a device may provide the components in the device platform layer 202. At porting layer 204, a set of APIs may be used to communicate with the device platform. Each API may include one or more methods that provide specific functionality. For example, a file management API 204a may provide methods for creating, reading, and deleting files that reside in memory. The porting layer 204 may provide an abstraction from the specifics of each device. That is, the layers above the porting layer 204 may be implemented without knowing the implementation details of each device 110. At the core services layer 206, many modules may be logically divided into sets of components, such as the user interface core 206a and the data service core 206b. The user interface core 206a may handle user interface interactions and content display. It may also implement modules that facilitate playback of content. The data service core may handle connections between the device 110 and a server 120, as well as local data storage in the file store 154. The application layer 208 may be the highest level of the architecture. At this level, applications may be written that use several of the modules of the core services layer 206 to create an application that would be useful to a user. A home screen, such as home screen 150, may reside in the application layer 208, but much of the functionality of the modules within the home screen 150 may reside in the core services layer 206 and the device platform layer 202.

In operation, an application, such as home screen 150 may be executed on device 110. The home screen 150 may access the data service core 206b in order to determine the last call that was made. The data service core 206b may utilize a method in the file management API 204a to read the local data 112 to determine the last call in the call log. The home screen 150 may use the last call information returned, the font component, and the user interface core in the core services layer 206 to render the information. These modules may further utilize components within the porting layer and the device platform to communicate the information to the user through the display of the device 110.

Figure 3:
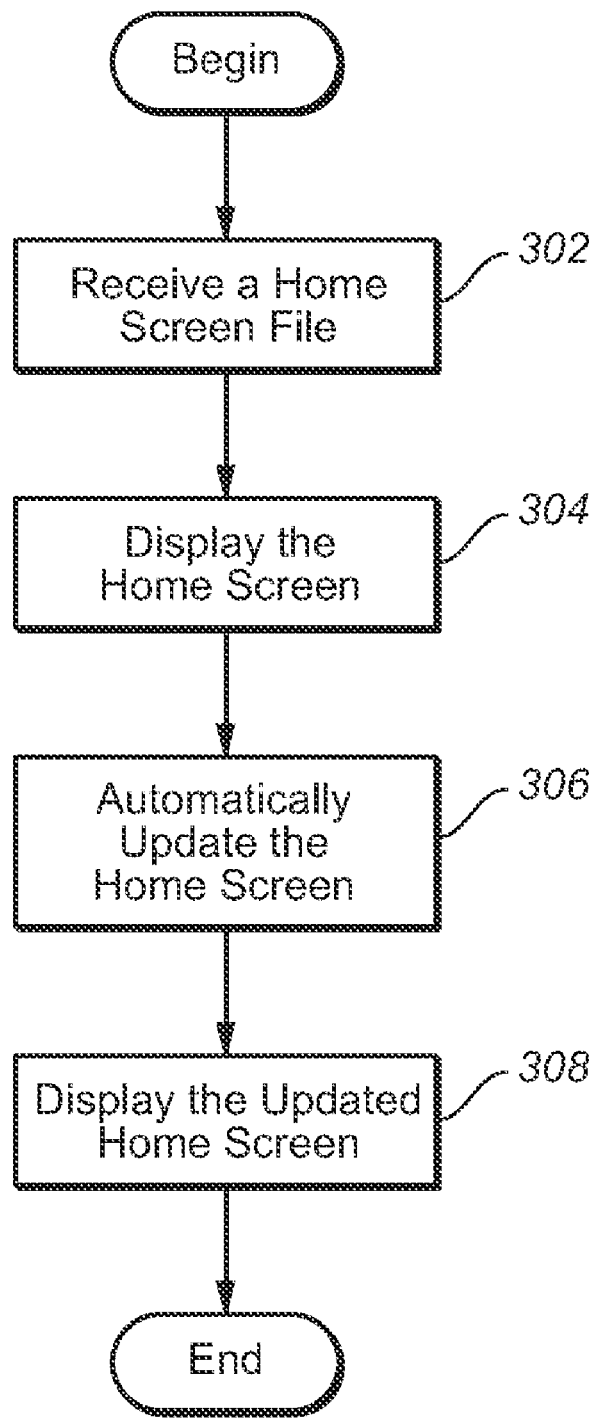
FIG. 3 is a flow chart illustrating an example process for updating a home screen on a mobile device in accordance with some aspects of the present disclosure.

FIG. 3 is a flow chart illustrating an example process for updating a home screen on a mobile device. At step 302, a home screen is received. The home screen may be stored in a data store. The home screen may be an executable file, contain instructions, and/or be included in one or more SWF files. At step 304, the instructions of the home screen may be performed and displayed on the mobile device. The user may interact with the displayed home screen. The home screen may start the execution of child SWFs. At step 306, a modification to the home screen is received. This modification may be automatically received in the data store 114 (see FIG. 1). The modification may be the result of the user requesting a new home screen, which may be indicated using the mobile device or may be requested directly from the service provider using, for example, a website. The modification to the home screen may replace the original home screen. The modification may add to or subtract from the instructions of the original home screen. In some implementations, before the modification becomes effective, a user may be prompted to determine whether to use the modification. In those implementations, if a user wishes to make the modification effective, then the method continues to step 308. At step 308, the updated home screen is displayed.

The preceding flowchart and accompanying descriptions illustrate example methods. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, methods may be used with additional steps, fewer steps, and/or different steps, so long as the methods remain appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving a first plurality of instructions from a data store of a mobile device, wherein the data store stores data that is automatically synchronized with data stored on a server remote from the mobile device, and the first plurality of instructions, when executed by a virtual machine on the mobile device, provide a first interface that allows a user to access services provided by an operating system on the mobile device using meta-data in the data store that defines permitted activities of the first plurality of instructions, wherein access to services provided by the operating system includes access to user data stored by the operating system through a porting layer between the virtual machine and the operating system in accordance with the meta-data defining permitted activities;
executing the first plurality of instructions on the mobile device using the virtual machine to provide the first interface to allow the user to access services provided by the operating system in accordance with the meta-data defining permitted activities of the first plurality of instructions;
updating the data store of the mobile device with a second plurality of instructions, wherein the second plurality of instructions when executed on the mobile device provide, relative to the first interface provided by the first plurality of instructions, a modified interface, relative to the first interface, that allows the user to access services provided by the operating system on the mobile device through the porting layer using meta-data in the data store that defines permitted activities of the second plurality of instructions; and
executing the second plurality of instructions on the mobile device using the virtual machine to provide the modified interface to allow the user to access services provided by the operating system in accordance with the meta-data defining permitted activities of the second plurality of instructions.

2. The method of claim 1, wherein the first interface provides access to at least one of: a call log, a user contact, or a user preference.

3. The method of claim 1, further comprising identifying a third plurality of instructions that when executed provide a safe mode interface adapted to allow the user to access services provided by the operating system on the mobile device, wherein the safe mode interface differs from the first interface and the modified interface; and executing the third plurality of instructions after encountering problems executing the first plurality of instructions or the second plurality of instructions.

4. The method of claim 1, further comprising storing content in the data store; automatically updating the content in the data store; and wherein the first plurality of instructions when executed are capable of reproducing the content.

5. The method of claim 4, wherein the content includes at least one of: game content, image content, video content, audio content, text content, or vector graphics content.

6. The method of claim 4, wherein automatically updating the content in the data store includes updating the content at a frequency selected based on a designated update frequency associated with the content.

7. The method of claim 1, wherein the interface provided by executing the first plurality of instructions includes a first user interface; and wherein the modified interface includes a second user interface, the second user interface including functionality that differs from functionality provided through the first interface.

8. The method of claim 7, wherein updating the data store with the second plurality of instructions includes receiving an indicator from a user to switch from the first user interface to the second user interface and updating the data store in response to the indicator.

9. A computer program product, encoded on a computer-readable medium, operable to cause data processing apparatus to perform operations comprising:
retrieving a first plurality of instructions from a data store of a mobile device, wherein the first plurality of instructions are executable by a virtual machine on the mobile device, the data store is automatically synchronized with data stored on a server remote from the mobile device, and the first plurality of instructions, when executed on the mobile device, provide a first interface for allowing a user to access services provided by an operating system on the mobile device using meta-data in the data store that defines permitted activities of the first plurality of instructions, wherein access to services provided by the operating system includes access to user data stored by the operating system through a porting layer between the virtual machine and the operating system in accordance with the meta-data defining permitted activities;

executing the first plurality of instructions on the mobile device using the virtual machine to provide the first interface to allow the user to access services provided by the operating system in accordance with the meta-data defining permitted activities of the first plurality of instructions;

updating the data store of the mobile device with a second plurality of instructions, wherein the second plurality of instructions when executed on the mobile device provide, relative to the first interface provided by the first plurality of instructions, a modified interface, relative to the first interface, for allowing the user to access services provided by the operating system on the mobile device through the porting layer using meta-data in the data store that defines permitted activities of the second plurality of instructions; and executing the second plurality of instructions on the mobile device to provide the modified interface to allow the user to access services provided by the operating system in accordance with the meta-data defining permitted activities of the second plurality of instructions.

10. The computer program product of claim 9, wherein the first interface provides access to at least one of: a call log, a user contact, or a user preference.

11. The computer program product of claim 9, further comprising identifying a third plurality of instructions that when executed provide a safe mode interface for allowing the user to access services provided by the operating system on the mobile device, wherein the safe mode interface differs from the first interface and the modified interface; and executing the third plurality of instructions after encountering problems with execution of the first plurality of instructions or the second plurality of instructions.

12. The computer program product of claim 9, further comprising storing content in the data store; automatically updating the content in the data store; and wherein the first plurality of instructions when executed are capable of reproducing the content.

13. The computer program product of claim 12, wherein the content includes at least one of: game content, image content, video content, audio content, text content, or vector graphics content.

14. The computer program product of claim 12, wherein automatically updating the content in the data store includes updating the content at a frequency determined based on a designated update frequency associated with the content.

15. The computer program product of claim 9, wherein the interface provided by executing the first plurality of instructions includes a first user interface; and wherein the modified interface includes a second user interface, the second user interface including functionality that differs from functionality provided through the first interface.

16. The computer program product of claim 15, wherein updating the data store with the second plurality of instructions includes receiving an indicator from a user to switch from the first user interface to the second user interface and updating the data store in response to the indicator.

17. A system comprising:
a persistent storage device including a data store storing data that is automatically synchronized with data stored on a server remote from the persistent storage device;
a display; and
one or more processors operable to interact with the persistent storage device and the display, the one or more processors further operable to:
receive a first plurality of instructions from the data store, wherein the first plurality of instructions, when executed by a virtual machine, provide a first interface that allows a user to access services provided by an operating system on a mobile device using meta-data in the data store that defines permitted activities of the first plurality of instructions, wherein access to services provided by the operating system includes access to user data stored by the operating system through a porting layer between the virtual machine and the operating system in accordance with the meta-data defining permitted activities;
execute the first plurality of instructions using a virtual machine to provide the first interface to allow the user to access services provided by the operating system in accordance with the meta-data defining permitted activities of the first plurality of instructions;
update the data store with a second plurality of instructions, wherein the second plurality of instructions when executed by a virtual machine on the mobile device provide, relative to the interface provided by the first plurality of instructions, a modified interface, relative to the first interface, that allows the user to access services provided by the operating system on the mobile device through the porting layer using meta-data in the data store that defines permitted activities of the second plurality of instructions; and
execute the second plurality of instructions using the virtual machine to provide the modified interface to allow the user to access services provided by the operating system in accordance with the meta-data defining permitted activities of the second plurality of instructions.

18. The system of claim 17, wherein the persistent storage device stores at least one of: a call log, a user contact, and a user preference; and the interface provides access to at least one of: the call log, the user contact, or the user preference.

19. The system of claim 17, wherein the virtual machine is adapted to execute on the one or more processors.

20. The system of claim 17, wherein the processor is further operable to identify a third plurality of instructions that when executed provide a safe mode interface for allowing the user to access services provided by the operating system on the mobile device, wherein the safe mode interface differs from the first interface and the modified interface; and execute the third plurality of instructions after encountering problems executing the first plurality of instructions or the second plurality of instructions.

21. The system of claim 17, wherein the processor is further operable to store content in the data store; automatically update the content in the data store; and wherein the first plurality of instructions when executed are capable of reproducing the content.

22. The system of claim 21, wherein the content includes at least one of: game content, image content, video content, audio content, text content, or vector graphics content.

23. The system of claim 21, wherein the processor is further operable to automatically update the content at a frequency based on a designated update frequency associated with the content.

24. The system of claim 17, wherein the interface provided by executing the first plurality of instructions includes a first user interface; and wherein the modified interface includes a second user interface, the second user interface including functionality that differs from functionality provided through the first interface.

25. The system of claim 24, wherein the processor is further operable to receive an indicator from a user to switch from the first user interface to the second user interface and update the first plurality of instructions in response to the indicator.

* * * * *

UNITED STATES PATENT AND TRADEMARK OFFICE
CERTIFICATE OF CORRECTION

| | | |
|---|---|---|
| PATENT NO. | : 8,271,889 B1 | Page 1 of 1 |
| APPLICATION NO. | : 11/945260 | |
| DATED | : September 18, 2012 | |
| INVENTOR(S) | : Beckert et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this
Thirtieth Day of September, 2014

Michelle K. Lee
*Deputy Director of the United States Patent and Trademark Office*